(12) United States Patent
Stewart

(10) Patent No.: US 12,340,646 B2
(45) Date of Patent: Jun. 24, 2025

(54) MEDIA HANDLING DEVICE MODULE ALIGNMENT

(71) Applicant: NCR Atleos Corporation, Atlanta, GA (US)

(72) Inventor: Jamie Stewart, Dundee (GB)

(73) Assignee: NCR Atleos Corporation, Atlanta, GA (US)

( * ) Notice: Subject to any disclaimer, the term of this patent is extended or adjusted under 35 U.S.C. 154(b) by 243 days.

(21) Appl. No.: 18/140,696

(22) Filed: Apr. 28, 2023

(65) Prior Publication Data

US 2024/0362965 A1 Oct. 31, 2024

(51) Int. Cl.
| | | |
|---|---|---|
| G07D 11/237 | (2019.01) | |
| G06Q 20/18 | (2012.01) | |
| G07D 11/40 | (2019.01) | |
| G07F 19/00 | (2006.01) | |
| G07D 11/00 | (2019.01) | |

(52) U.S. Cl.
CPC .......... *G07D 11/237* (2019.01); *G06Q 20/18* (2013.01); *G07D 11/40* (2019.01); *G07F 19/201* (2013.01); *G07F 19/202* (2013.01); *G07F 19/203* (2013.01); *G07F 19/209* (2013.01); *B65H 2402/10* (2013.01); *B65H 2402/60* (2013.01); *G07D 11/00* (2013.01); *G07D 2211/00* (2013.01)

(58) Field of Classification Search
CPC ................ G07D 11/40; B65H 2402/10; B65H 2402/60; G03G 2221/1696; G03G 21/1647; G03G 2221/1654
See application file for complete search history.

(56) References Cited

U.S. PATENT DOCUMENTS

| | | | |
|---|---|---|---|
| 6,516,998 B2 * | 2/2003 | Calder | G07D 11/14 235/383 |
| 8,127,985 B1 | 3/2012 | Kolinski-schultz | |

FOREIGN PATENT DOCUMENTS

| | | |
|---|---|---|
| EP | 1307859 | 2/2005 |
| EP | 2015260 | 1/2009 |
| EP | 1843303 | 8/2016 |

* cited by examiner

*Primary Examiner* — Jeremy R Severson
(74) *Attorney, Agent, or Firm* — Schwegman Lundberg & Woessner, P.A.

(57) ABSTRACT

Sensors are mounted to surfaces of an intermediate module and a lower module of a media handling device. The sensors report to firmware and the firmware determines whether the lower module is in proper alignment with the intermediate module based on the reported sensor data. A spring plunger is configured with sufficient tension to push the lower module into alignment and a motorized latch controlled by the firmware is configured to pull the lower module into alignment and/or assist the spring plunger in pushing the lower module into alignment. In an embodiment, a lid and a lid alignment rail apparatus is provided to ensure a lid of the lower module is properly latched, aligned, and unlatched.

20 Claims, 15 Drawing Sheets

MEDIA HANDLING DEVICE MODULE ALIGNMENT

BACKGROUND

Media handling devices are associated with transaction terminals such as automated teller machines (ATMs) and self-service terminals (SSTs). Media handling devices include an upper media transport with related modules, an intermediate transaction, and a lower transport with related modules. The lower modules are associated with a safe that stores and dispenses notes through the media handling device during transactions at the terminals.

Service is often required on the media handling device for note jams, module failure, etc. During a service visit the lower module needs to be properly aligned with the intermediate module so as to ensure a note jam is unlikely to occur after the service visit. Misalignment of the lower module is a common issue associated with any service that needs performed on the media handling device. Any misalignment can cause the note path to be misaligned and result in note/media jams. The misalignment can be due to the tolerance of the note path and/or modules situated along the note path and/or due to excessive re-racking of a module by the service technician following a service visit to the terminal. The misalignment will itself result in an additional service call to remove jammed notes/media and/or replace any broken parts as a result of the excessive re-racking.

SUMMARY

In various embodiments, a media recycler/dispenser, a terminal, and method for automatic alignment of modules in a media recycler/dispenser are presented. Sensors are mounted to surfaces of an intermediate module and a lower module of a media handling device. The sensors report to firmware and the firmware determines whether the lower module is in proper alignment with the intermediate module based on the reported sensor data. A spring plunger is configured with sufficient tension to push the lower module into alignment and a motorized latch controlled by the firmware is configured to pull the lower module into alignment and/or assist the spring plunger in pushing the lower module into alignment. In an embodiment, a lid and a lid alignment rail apparatus is provided to ensure a lid of the lower module is properly latched, aligned, and unlatched

DETAILED DESCRIPTION

Misalignment between a lower module and upper module of a media handling device is problematic and occurs following a service action that requires access to components, parts, or other modules associated with lower and upper modules. An existing approach used to assist service technicians to properly rack the modules includes a mechanical latch. A predefined mechanical based tolerance is associated with determining whether the lower and upper modules are aligned. However, due to manufacturing variances and tolerance build ups, the mechanical latch is unreliable and misalignment between the lower and upper modules frequently occurs. This then results in the central line of the media path being misaligned and causes media jams at the interface between the upper and lower modules and/or results in damage to the media which then causes media jams further downstream in the media handling device such as stacking areas or gate mechanisms.

The current misalignment issues are resolved with the teachings provided herein and below. Sensors, an electromechanical latch with motor, and a spring plunger are added to a media handling device along with firmware instructions to process sensor information received from the sensors and to drive the electromechanical latch through the motor are provided to provide automatic alignment of the lower module with the upper module. This provides repeatable and reliable alignments for the upper and lower modules of a media handling device which are not dependent on arbitrary and predefined tolerances or manufacturing variances in the components or parts of the upper and lower modules.

In an embodiment, a lower module lid with a lid alignment apparatus is also provided to ensure the lid is properly latched on to and unlatched from the lower module. The lid alignment apparatus ensures accurate vertical alignment of the lid to the lower module and ensures the lid is properly latched to the lower module when the lower module is racked into a safe (e.g., safe module) of the media handling device. The lid alignment apparatus also ensures that the lid cannot be opened if the apparatus is not fully extended and does not fully clear a top of the lower module even if the lower module is outside of and partially racked out of the safe.

Figure 1A:
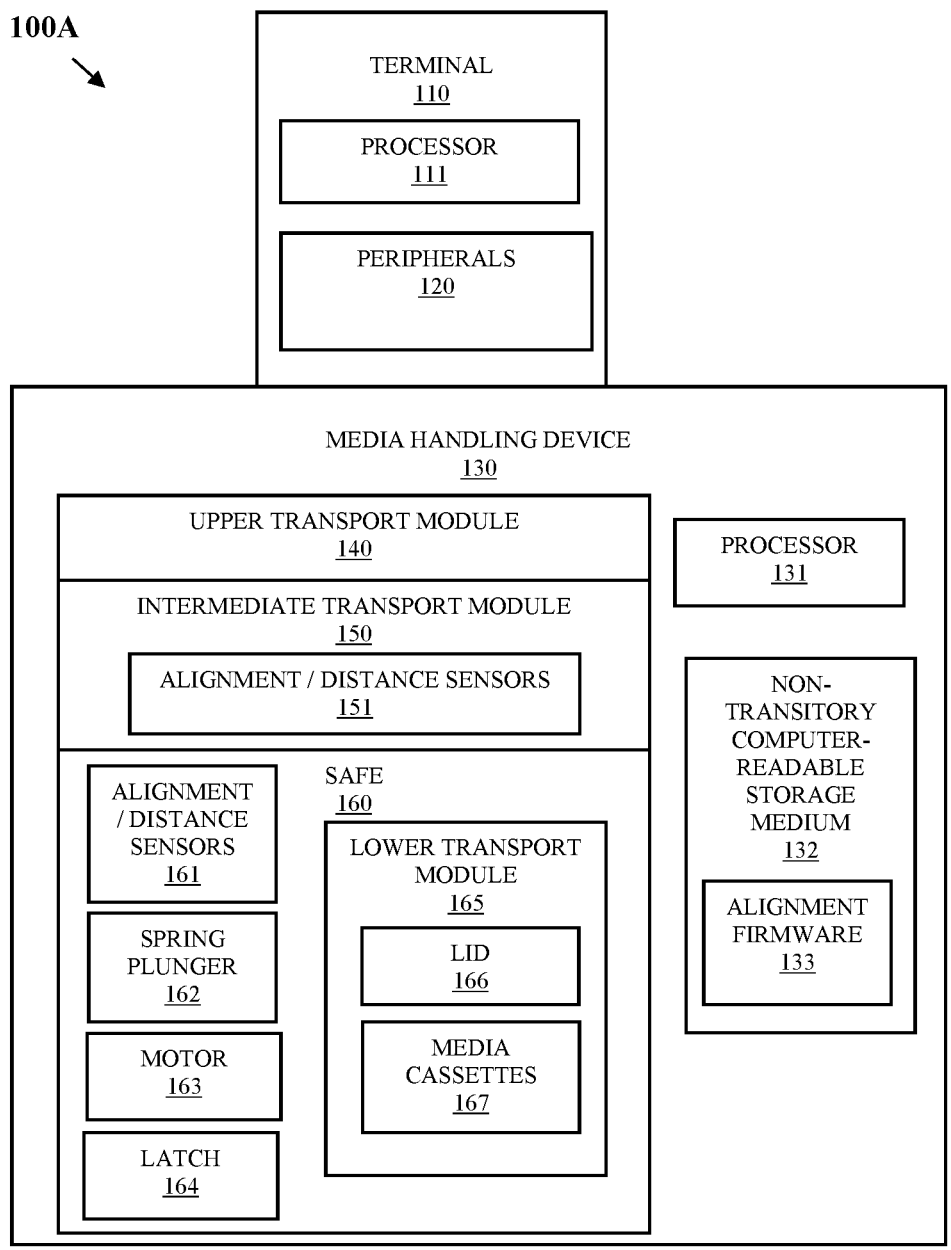
FIG. 1A is a diagram of a terminal that includes a media handling device for automatic alignment of modules, according to an example embodiment.

FIG. 1A is a diagram of a system 100A for automatic alignment of modules, according to an example embodiment. It is to be noted that the components are shown schematically in greatly simplified form, with only those components relevant to understanding of the embodiments being illustrated.

Furthermore, the various components (that are identified in FIG. 1A) are illustrated and the arrangement of the components is presented for purposes of illustration only. It is noted that other arrangements with more or less components are possible without departing from the teachings of destroying notes of a media cassette upon detection of a security breach presented herein and below.

The system 100A includes a terminal 110 and a media handling device 130. The terminal 110 includes a processor 111 and a variety of peripherals 120. The peripherals include, by way of example, only, a card reader, a touchscreen display, a personal identification number (PIN) pad, a receipt printer, a bioptic scanner, a vertical scanner, a horizontal scanner, a handheld scanner, a weigh scale, a combined scanner and scale, a near field communication (NFC) transceiver, a wireless transceiver, etc.

The media handling device 130 is also a peripheral of the terminal 110. The media handling device 130 includes an upper transport module 140, an intermedia transport module 150, a safe 160, a processor 131 and a non-transitory computer-readable storage medium (hereinafter just "medium") 133, which includes executable alignment firmware instructions 133. The instructions 133 when executed by the processor 131 cause the processor 131 to perform operations discussed herein and below with respect to firmware 133.

The intermediate transport module 140 includes one or more alignment/distance sensors 151. The safe includes one or more alignment/distance sensors 161, a spring plunger 163, a motor 163, a latch 164, and lower transport module 165. The lower transport module 165 includes a lid apparatus 166 and media cassettes 167 for storing and dispensing banknotes and/or checks.

It is to be noted that each of upper transport module 140, intermediate transport module 150, and lower transport module 165 include a variety of their own modules. For example, upper transport module 140 can include an escrow module, an upper transport media path module, a media deskew module, a media validation module, and media escrow module, etc. The intermediate transport module can include a media diverter module, etc. Again, only those modules and/or components necessary for comprehending the teachings presented herein and below are discussed and illustrated in the FIGS.

Figure 1B:
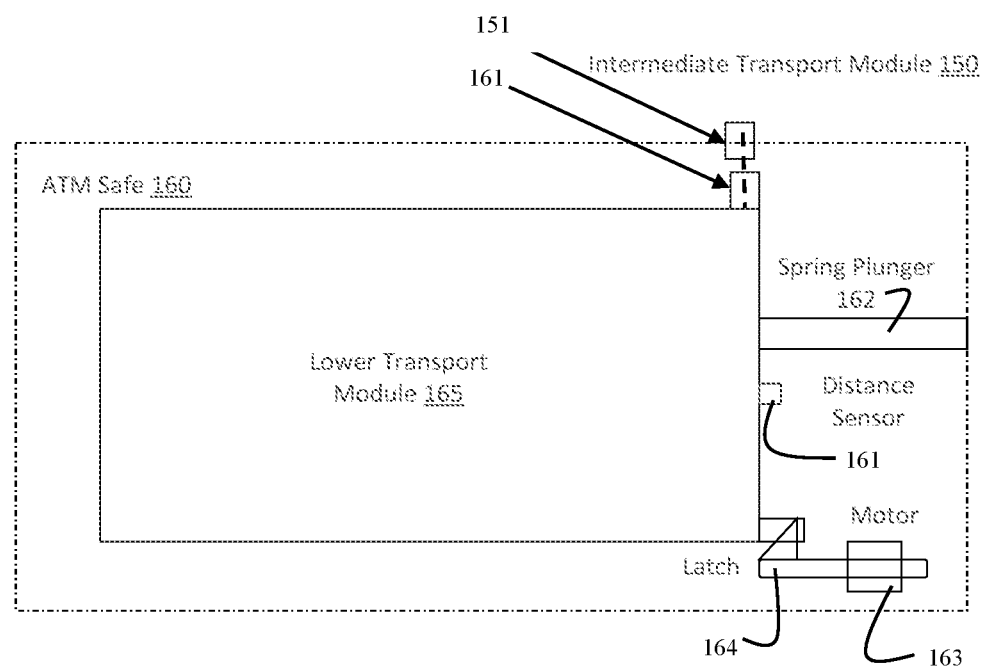
FIG. 1B is a diagram of a media handling device with a lower module in proper alignment with an intermediate module, according to an example embodiment.

FIG. 1B is a diagram 100B of a media handling device 130 with a lower module 165 in proper alignment with an intermediate module 150, according to an example embodiment. A senor 151 of intermediate module 150 is mounted on a bottom surface intermediate module 150 and a sensor 161 is mounted on a top surface of lower module 165. In an embodiment, the sensors 161 and 151 are optical sensors.

The sensors 161 and 151 are mounted and directly oppose one another when the note/media path of the intermediate module 150 and the note/media path of the lower module 165 are properly aligned to ensure a note feed path between the modules 150 and 165 is properly aligned to avoid any note/media jams. Should the sensors 161 and 151 be misaligned, the sensors 161 and 151 report a full or partial blockage to firmware 133.

As illustrated in FIG. 1B, the intermediate module 150 and lower module 165 are in an aligned state, such that firmware 133 takes no action with respect to activating motor 163 and driving latch 164 to move the lower module 165 in a direction needed for proper alignment.

Additionally, a distance sensor 161 mounted on a rear surface of the lower module 165 reports a distance between the back surface of module 165 to the back of the safe 160. Firmware 133 uses the distance provided by sensor 161 to determine when to stop nudging forward or pulling backward module 165 for purposes of properly aligning sensors 161 and 151 with one another. In the instant case illustrated in FIG. 1B, the reported distance informs firmware 133 that module 165 does not need pushed forward or pulled backward because sensors 151 and 161 are in alignment.

Misalignment between the lower 165 and intermediate 150 modules can be based on the lower module 165 being out of alignment by being too far forward within safe 160, too far backward within safe 160, too far to one side within the safe. The lid 166 of a top of lower module 165 can also not be fully aligned and latched or not fully unlatched. The manners in which of these different misalignments and proper alignments are now discussed with reference to FIGS. 1C-1D, 2A-2E, and 3A-3E.

Figure 1C:
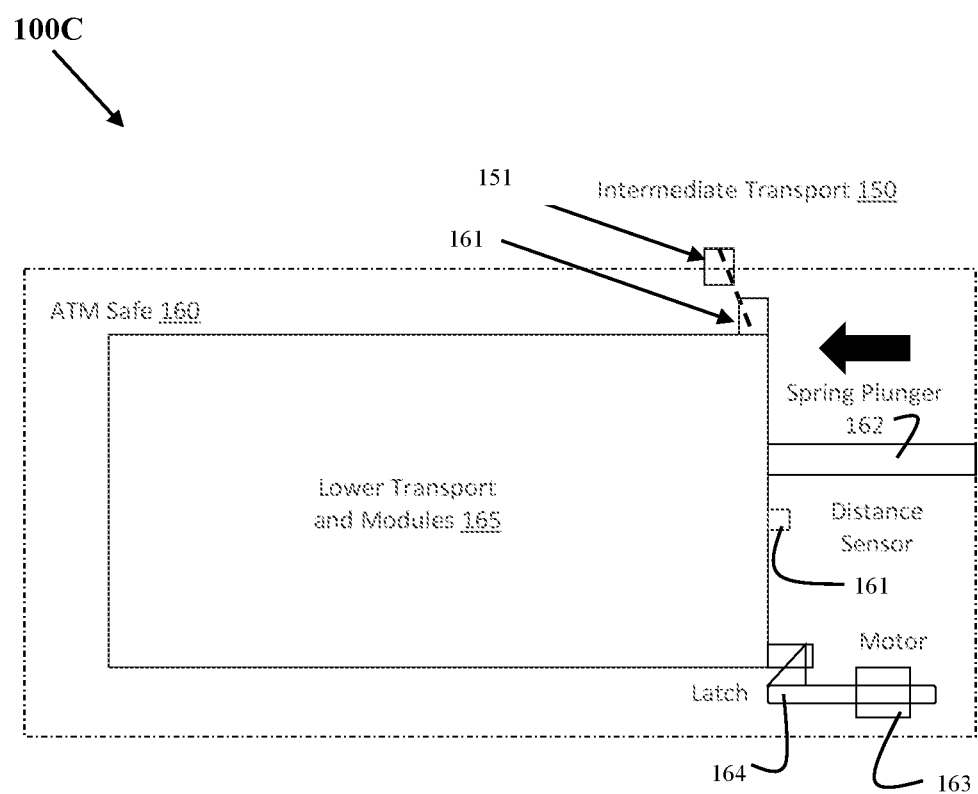
FIG. 1C is a diagram of a media handling device with the lower module skewed and out of alignment necessitating the lower module to be moved forward, according to an example embodiment.

FIG. 1C is a diagram 100C of a media handling device 130 with the lower module 165 skewed and out of alignment necessitating the lower module 165 to be moved forward into proper alignment, according to an example embodiment. A back wall of safe 160 includes an electronic latch 164 coupled to a motor 163, the motor 163 controlled through a printed circuit board (PCB) by processor 131 through firmware 133. An opposite end of latch 164 is affixed to a back or side outer surface of module 165. Safe 160 further includes a spring plunger 162 affixed on one end to a back or side wall of safe 160 and an opposite end of plunger 162 wedged and in contact with a back or side wall of module 165.

The alignment state of the lower 165 and intermediate 150 modules illustrated in diagram 100C causes sensor 151 to report a back portion of sensor 161 is visible while causing sensor 161 to report a front portion of sensor 151 to firmware 133. This is an indication to firmware 133 that in order to align the sensors 151 and 161 module 165 must be moved forward from the back of safe 160. Spring plunger 162 includes a configured tension for this alignment state that causes the spring to push or force against the surface of module 165 moving module 165 forward within safe 160 to reach its configured tension. Simultaneous to the pushing forward of module 165 by spring plunger 162, firmware activates motor 163 and gently nudges module 165 forward, via latch 164, into proper alignment.

Firmware 133 uses a current distance reported by distance sensor 161 between the back surface of module 165 and safe 160 to determine how much of a distance the motor 163 needs to move latch 164 forward. Firmware 133 cuts motor 163 causing module 165 to stop moving when the distance reported is a preconfigured distance and when sensors 151 and 161 report being in alignment with one another.

Figure 1D:
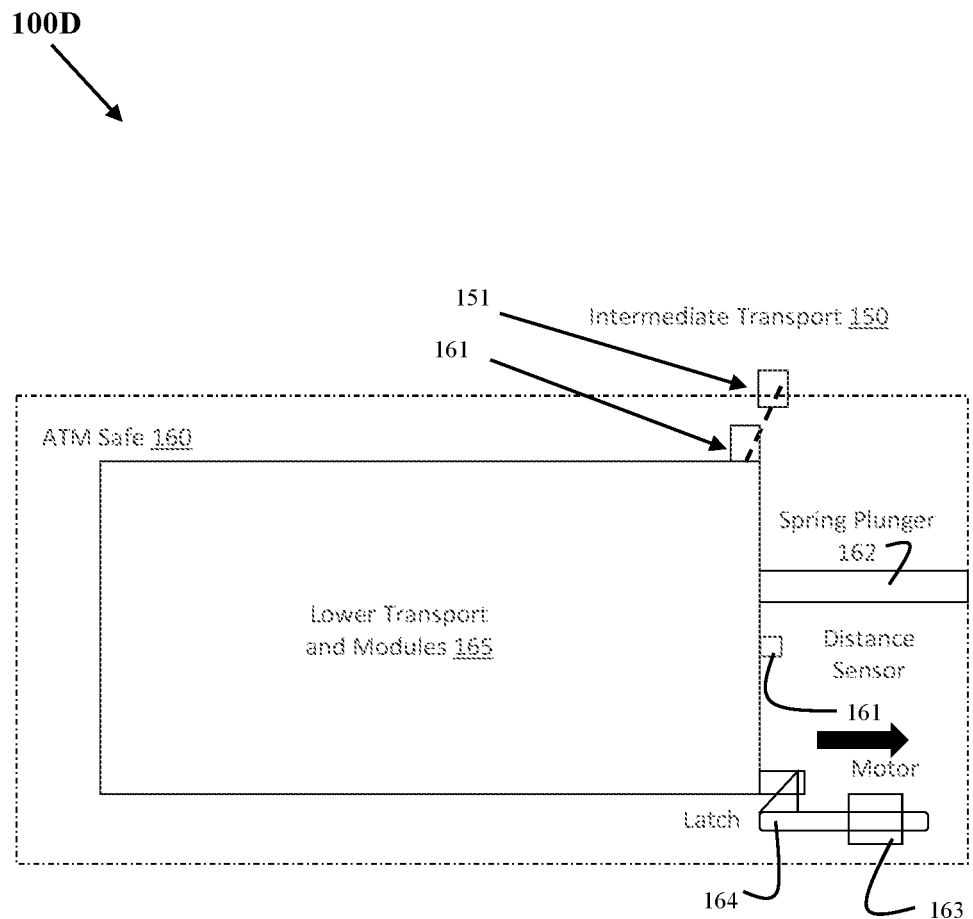
FIG. 1D is a diagram a media handling device with the lower module skewed and out of alignment necessitating the lower module to be moved backward, according to an example embodiment.

FIG. 1D is a diagram 100D a media handling device 130 with the lower module 165 skewed and out of alignment necessitating the lower module 165 to be moved backward into proper alignment, according to an example embodiment. Sensor 161 reports seeing a back portion of sensor 151 and sensor 151 reports seeing a front portion of sensor 161 to firmware 133. This is an indication to firmware 133 the alignment state of module 165 and module 150 is one in which module 165 is too far forward within safe 160. Firmware 133 controls motor 163 to pull module 165, via latch 164, backward and into proper alignment.

Distance sensor 161 reports a distance that is greater than a preconfigured distance between the back surface of module 165 and safe 160 to firmware 133. Firmware 133 activates and controls motor 163 to pull latch 164 back towards the back wall of the safe 160 until the distance reported by distance sensor 161 is a preconfigured distance and until sensors 151 and 161 are reporting being in alignment with one another.

Figure 2A:
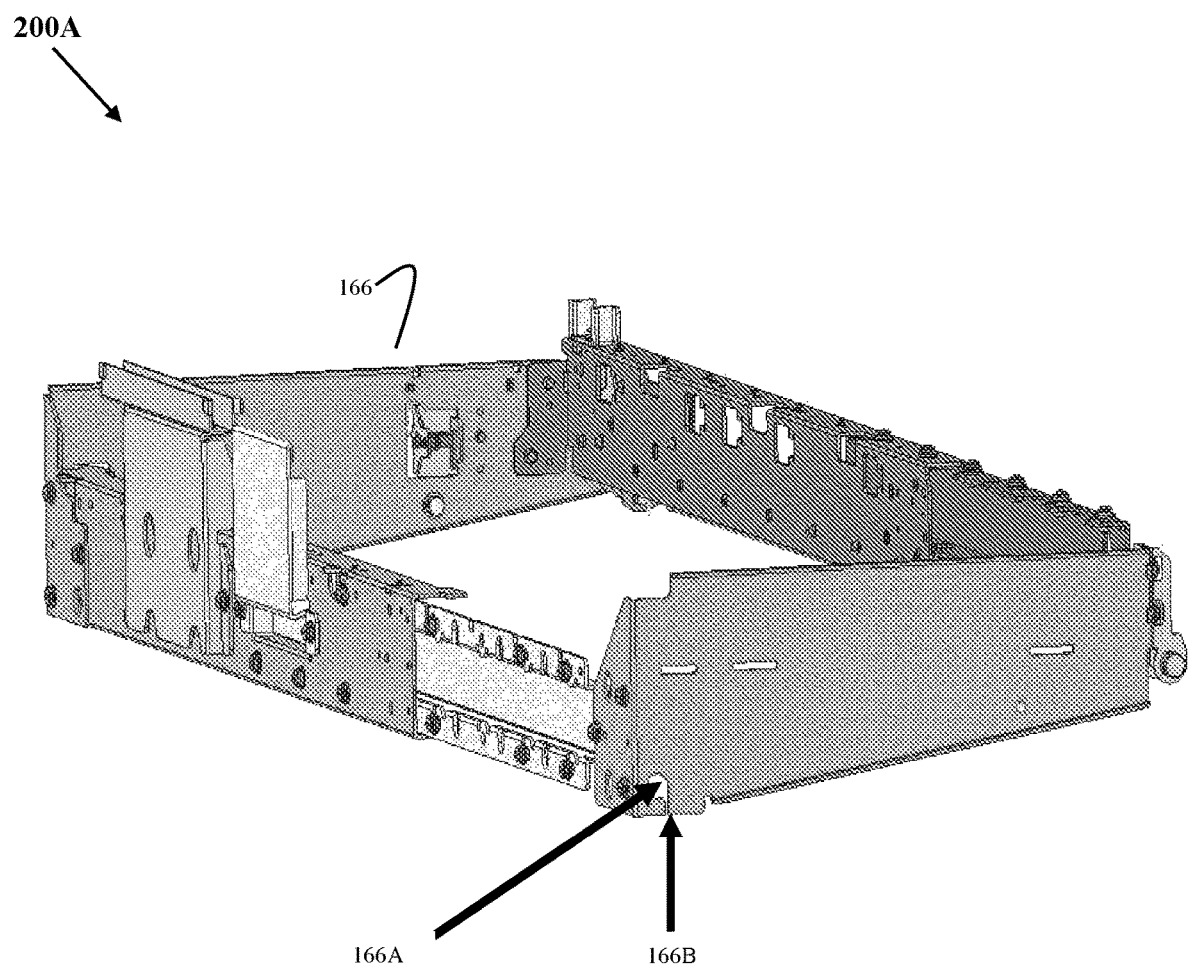
FIG. 2A is a diagram of a lid for the lower module of the media handing device, according to an example embodiment.

FIG. 2A is a diagram 200A of a lid 166 for the lower module 165 of the media handing device 130, according to an example embodiment. In a corner of a sidewall of lid 166 is an aperture 166A and a slit 166B from a bottom of the sidewall into the aperture 166A. This is a P-shaped aperture manufactured into lid 166 or retrofitted into an existing lid to create lid 166.

Figure 2B:
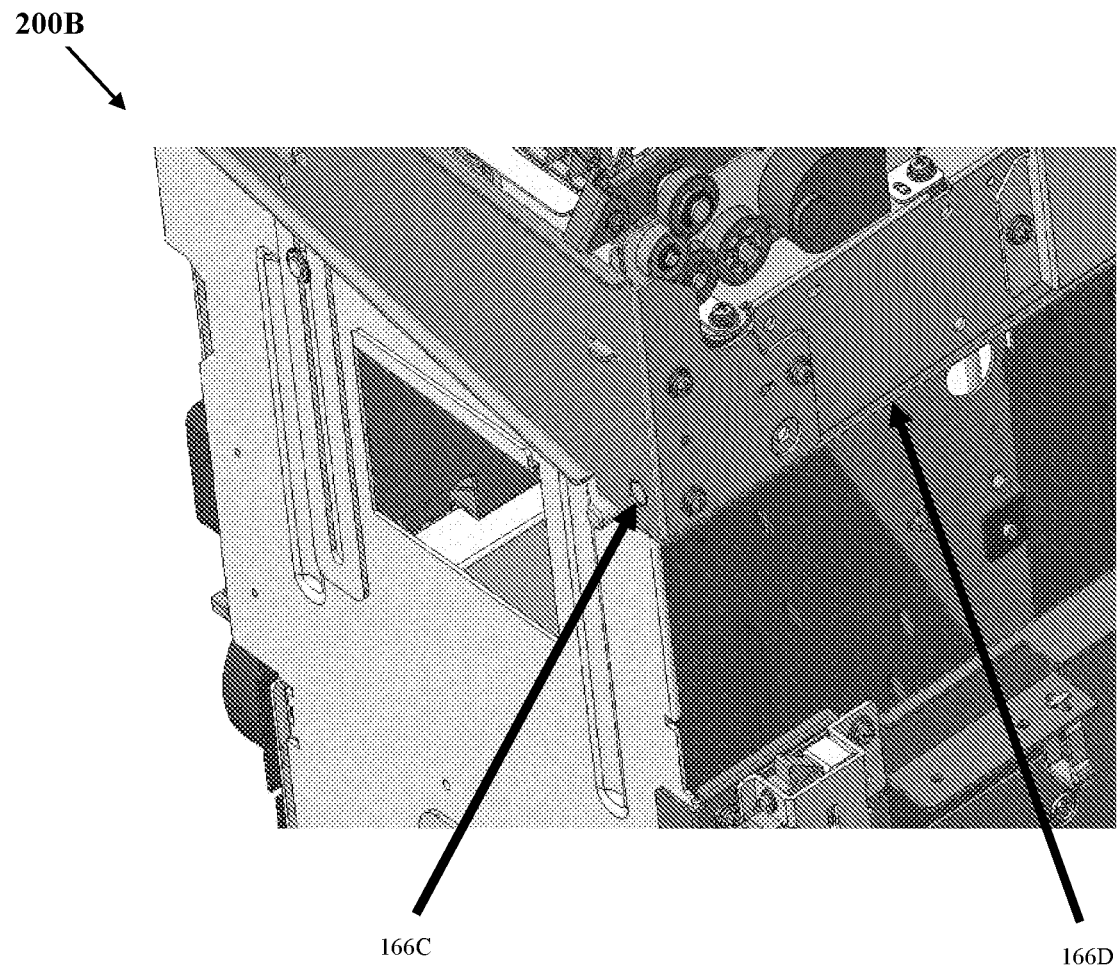
FIG. 2B is a diagram of the lid properly aligned and latched on a top of the lower module when a safe door is closed shut for the lower module, according to an example embodiment.

FIG. 2B is a diagram 200B of the lid 166 properly aligned and latched on a top of the lower module 165 when a safe door of lower module 165 is closed shut, according to an example embodiment. A lid apparatus is provided to fit through and latch into lid aperture 166A and slit 166B. The lid apparatus includes a spring plunger rod 166C and a rail 166D (more fully illustrated in FIGS. 2D and 2E below). The lid apparatus locks or latches into place when it is fully inserted into aperture 166A and slit 166B. Diagram 200B illustrates that a tip of rod 166C is flush with an outer surface of the lid 166 and rail 166D runs under a bottom surface of a side of lid 166 such that just the tip of rod 166C is visible in diagram 200B. In this state, the lid 166 is correctly aligned and latched to the top of module 165. A safe door of safe 160 compresses the spring plunger rod 166A to be flush and locks rail 166D into slit 166B when the safe door is closed.

Figure 2C:
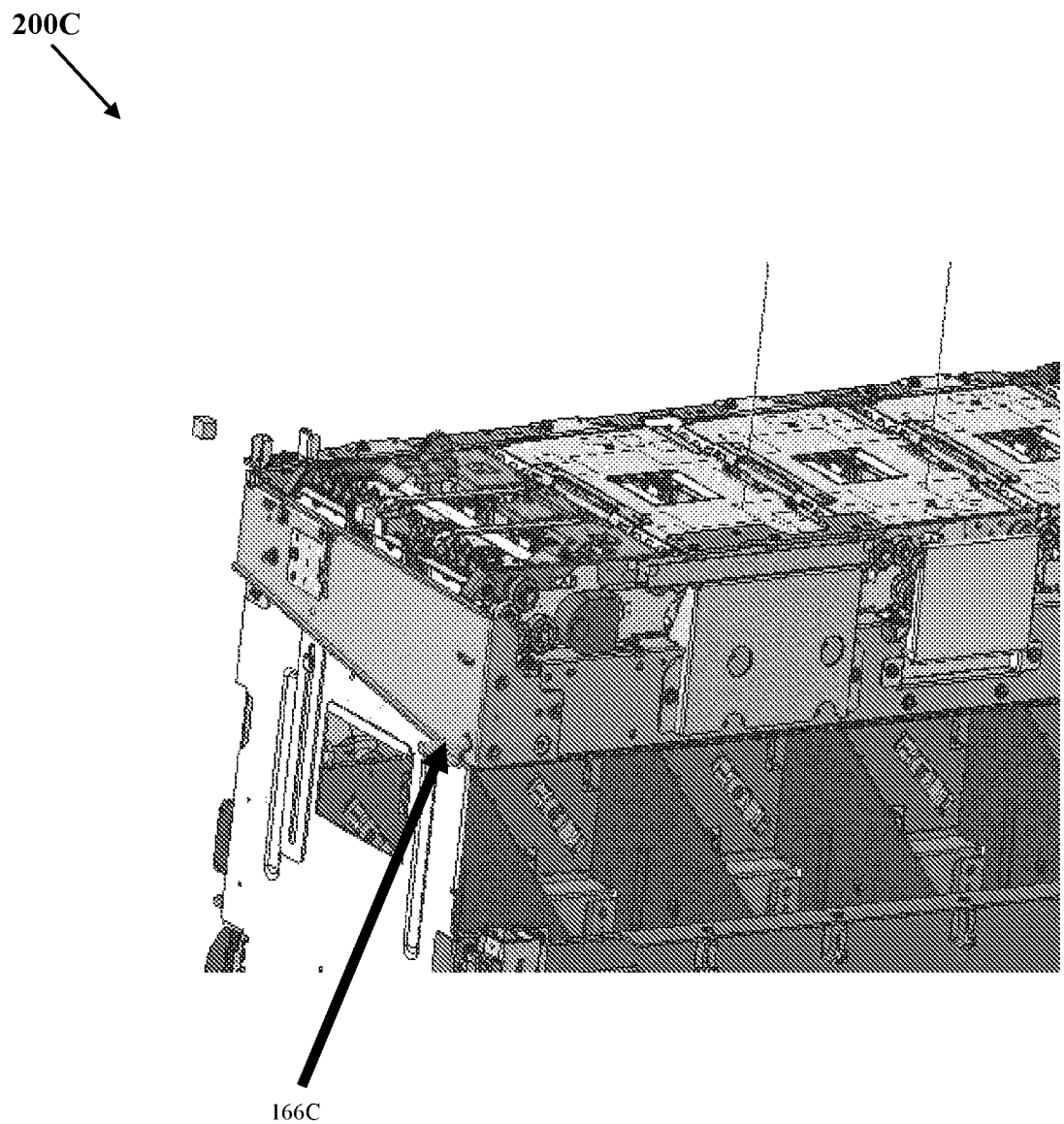
FIG. 2C is a diagram lid vertically properly aligned and latched on the top of the lower module when the safe door is opened, according to an example embodiment.

FIG. 2C is a diagram 200C of the lid 166 properly aligned and latched on the top of the lower module when the safe door of safe 160 is opened, according to an example embodiment. Rail 166D is still locked or latched fully into slit 166B of lid 166 such that an end of rail 166B is not visible in diagram 200C. However, when the safe door is opened, spring rod 166C springs forward and a portion of rod 166C is visible extending out of a side of lid 166. The list 166 is properly aligned and latched but the lid apparatus 166C and 166D needs removed from the lid 166 fully before lid 166 can be unlatched and removed from the top of module 165 for access to media cassettes 167.

Figure 2D:
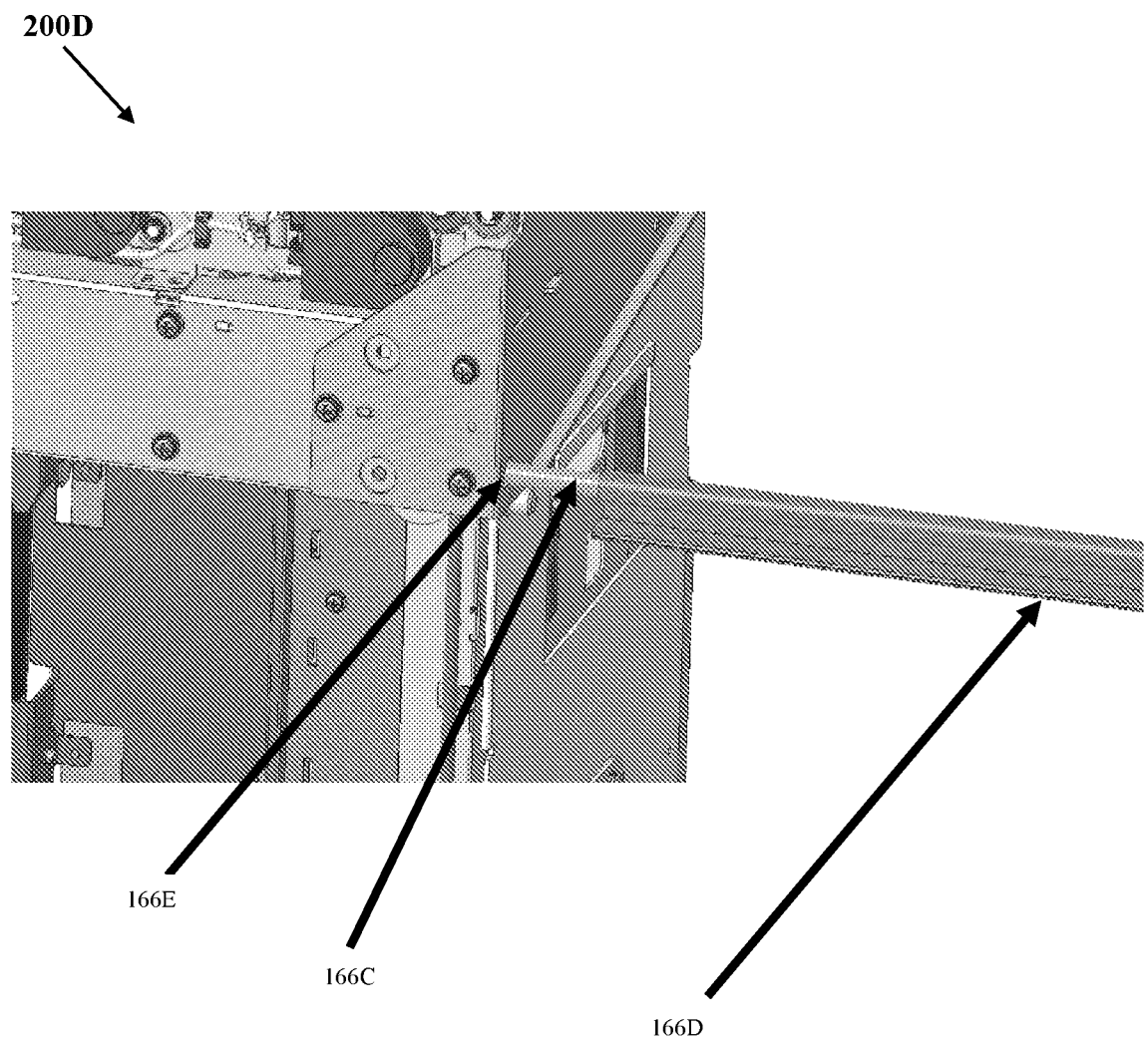
FIG. 2D is a diagram of an alignment and latching apparatus for the lid illustrating that apparatus has not fully cleared the lid so as to permit the lid to be removed from the top of the lower module, according to an example embodiment.

FIG. 2D is a diagram 200D of an alignment and latching apparatus 166C and 166D for the lid 166 illustrating that the apparatus 166C and 166D has not fully cleared the lid 166 so as to permit the lid 166 to be removed from the top of the lower module 165, according to an example embodiment. Diagram 200D shows spring rod 166D inserted into a tube aperture of rail 166D, the outer surface of the tube inserts into aperture 166A while a base that extends off of the outer surface of the tube extends straight down and is inserted through slit 166B of lid 166. The bottom of the base extends out horizontally to form a lip and to fit under a side of lid 166 and run for a length of the side of lid 166 under a bottom surface of the side. As illustrated in diagram 200D an end of spring rod 166C still remains inside aperture 166A illustrated as 166E in FIG. 2D. This means that even though the rail 166D has cleared slit 166B, the rod 166C still has not cleared aperture 166A and lid 166 is incapable of being removed from the top of module 165. The lid apparatus 166C and 166D is clear of an opened safe door for safe 160 but spring rod 166C is still extends within the aperture 166A of lid 166. Thus, in this lid state the lid 166 cannot be properly removed from the top of module 165.

The phrase "id apparatus," "alignment rail," "rail latch apparatus," "lid rail latch apparatus," and/or "lid alignment rail apparatus" may be used interchangeable and synonymously herein. These phrases refer to the combination of spring rod 166C and rail 166D.

Figure 2E:
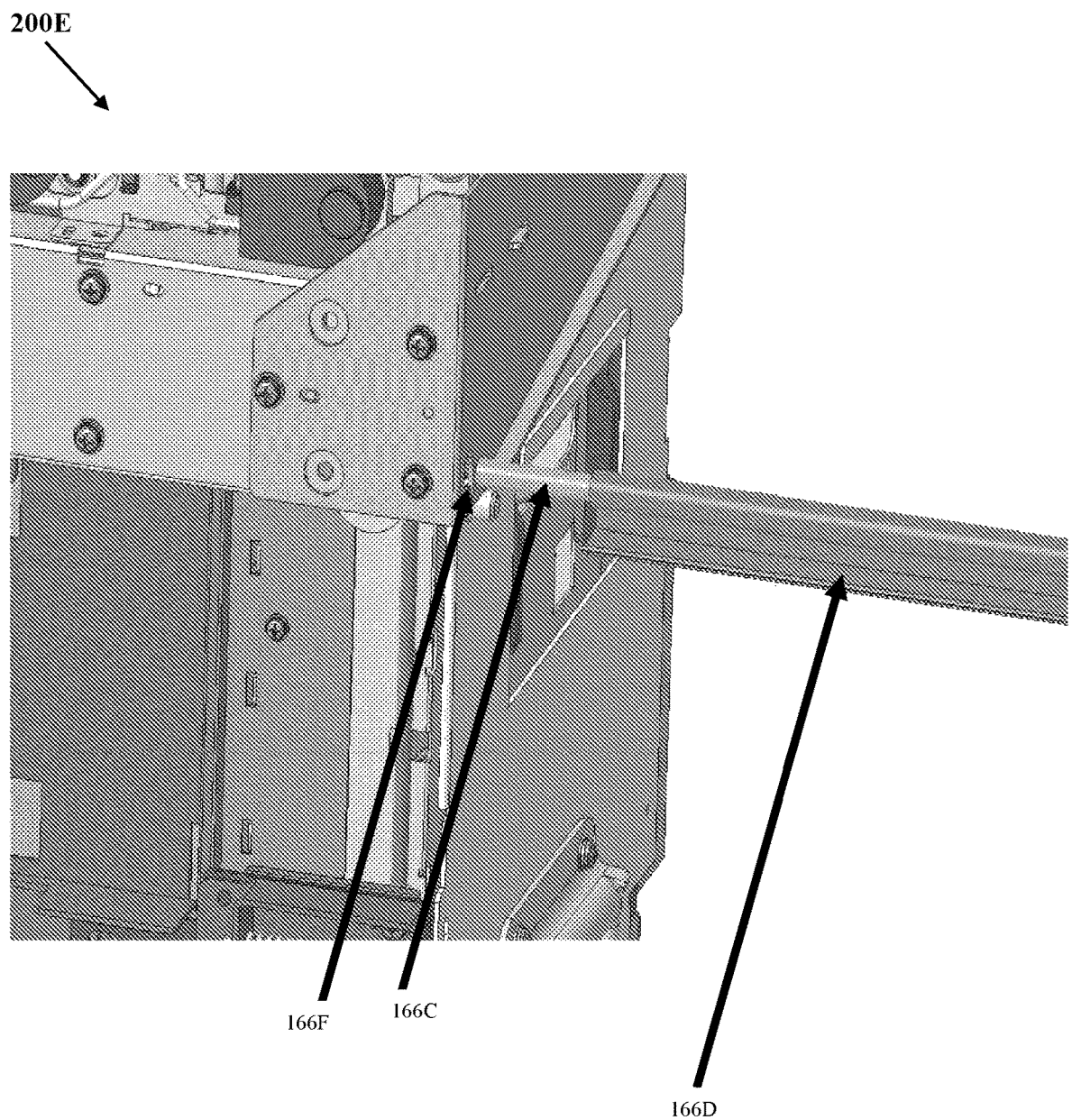
FIG. 2E is a diagram of the alignment and latching apparatus for the lid illustrating that the apparatus has fully cleared the lid such that the lid can be removed from the top of the lower module, according to an example embodiment.

FIG. 2E is a diagram 200E of the alignment rail 166C and 166D for the lid 166 illustrating that the alignment rail 166C and 166D has fully cleared the lid 166 such that the lid 166 can be removed from the top of the lower module 165, according to an example embodiment. 166E in FIG. 2E is intended to illustrate a gap or space between an end of rod 166C and aperture 166A, which means alignment rail 166C has been fully removed from lid 166 such that lid 166 can now be removed from the top of module 165 where media cassettes 167 are accessible for media replenishment and/or cassette service activities.

FIGS. 3A-3E illustrate an alternative or an additive embodiment to what was shown in FIGS. 1B-1D. The embodiments of FIGS. 1B-1D utilized a bottom mounted sensor 151 on intermediate module 150, a top mounted sensor 161 on lower module 165, and a back or side mounted distance sensor 161 to identify when the lower module 165 is in proper alignment with the intermediate module 150. FIGS. 3A-3E can achieve alignment with two bottom mounted sensors 161 on a front base of the lower module 165. It is noted that these embodiments are not mutually exclusive such that in an embodiment a bottom mounted sensor 151, a top mounted sensor 161, a side mounted distance sensor 161, and two bottom mounted sensors 161 can be utilized with the teachings presented herein.

Figure 3A:
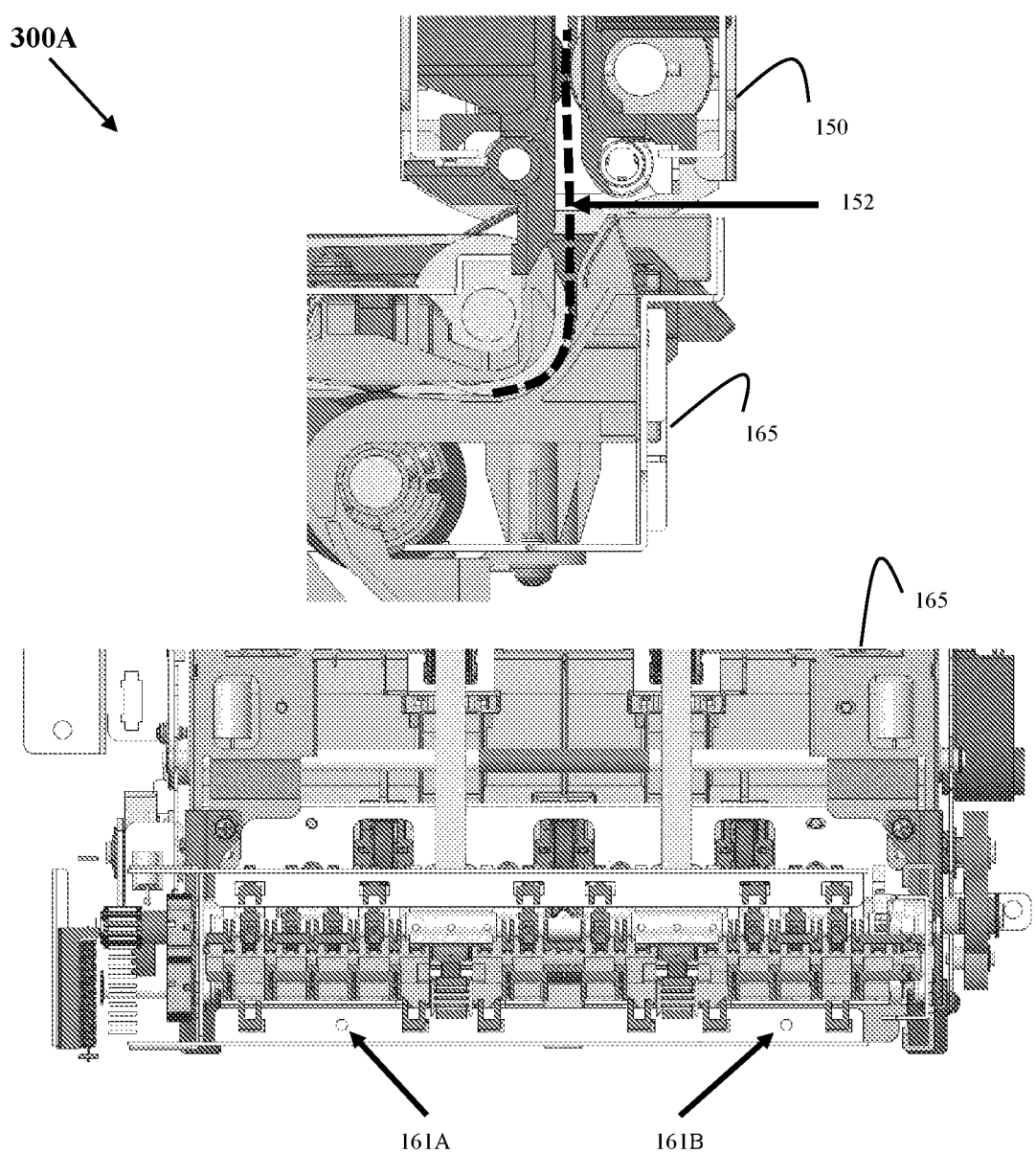
FIG. 3A illustrates proper alignment of the lower module and intermediate module with sensors of the lower module unblocked, according to an example embodiment.

FIG. 3A illustrates a diagram 300A for proper alignment of the lower module 165 and intermediate module 150 with sensors 161A and 161B of the lower module 165 unblocked, according to an example embodiment. The top diagram illustrates the connection between the lower module 165 and intermediate module 150 to create a note/media path 152. As illustrated in FIG. 3A, the note/media path 152 (dotted line in FIG. 3A) is aligned and unobstructed such that there is no catch points for the notes/media to jam.

The bottom figure illustrates that two lower module 165 sensors 161 are unobstructed since the circles 161A and 161B representing the location of two bottom mounted sensors 161 of module 165 are clear and unobstructed. This means the lower module 165 is properly aligned within safe 160. Sensors 161 report being clear, such that firmware 133 takes no action to align module 165 within the safe 160.

Figure 3B:
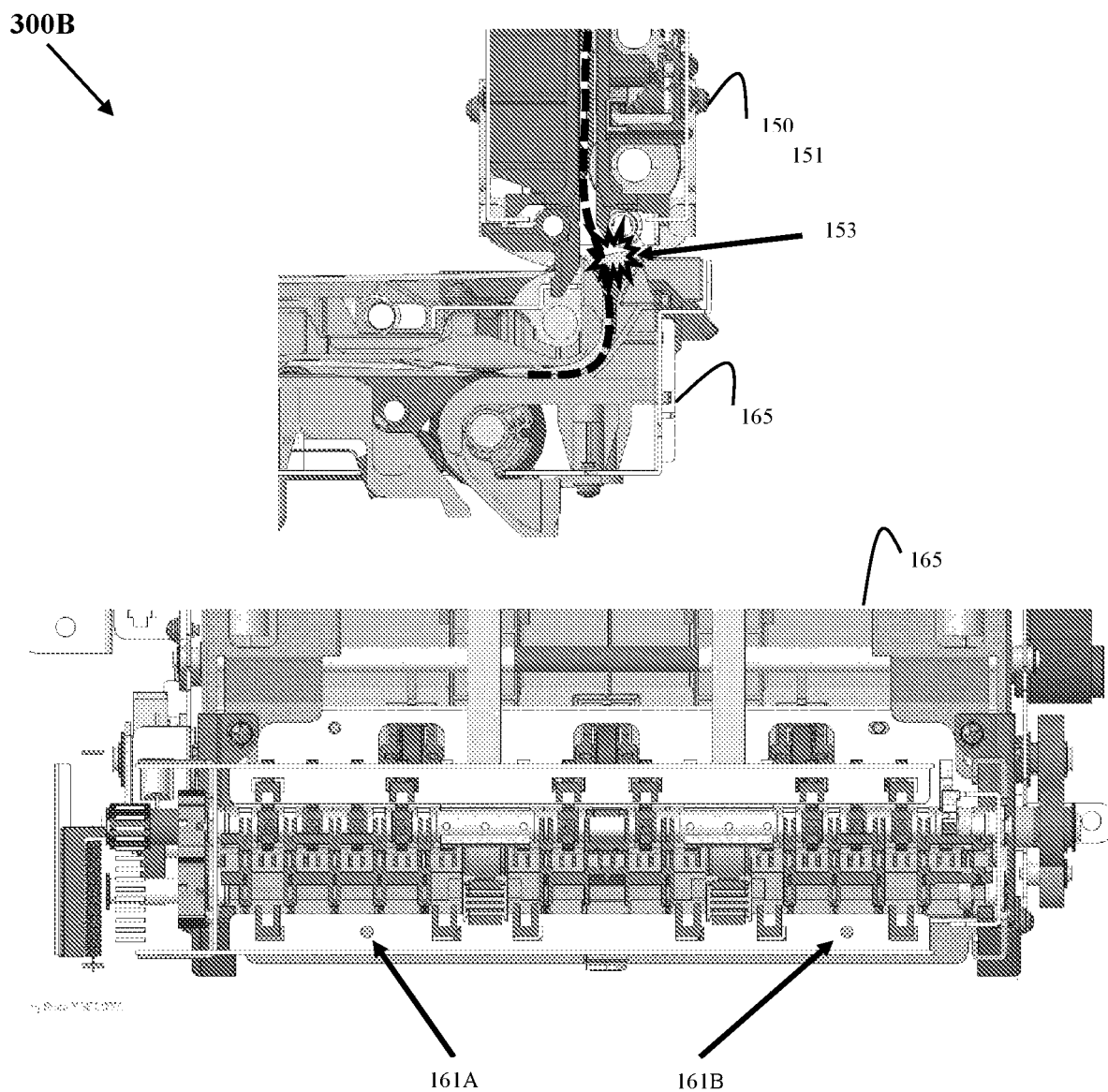
FIG. 3B illustrates a forward misalignment of the lower module and intermediate module with the sensors of the lower module blocked, according to an example embodiment.

FIG. 3B illustrates a diagram 300B for a forward misalignment of the lower module 165 and intermediate module 150 with two bottom mounted sensors of the lower module 165 blocked, according to an example embodiment. In this example, the circles 161A and 161B representing the location of the sensors 161 report both being fully blocked (circles 161A and 161B are greyed out in FIG. 3B) to firmware 133. This indicates that to firmware 133 that module 165 is located too far towards the back of safe 160. Spring plunger 162 is configured to push against a back surface of module 165 while firmware 133 activates motor 163 to nudge, via latch 164, module 165 forward and into alignment. Firmware 133 can also place motor 163 in neutral and allow spring plunger 162 to move module 165 into alignment with module 150 on its own.

In an embodiment, distance sensor 161 (discussed in FIGS. 1B-1D) reports a distance from the back surface of module 165 to the back of the safe. The distance when compared to a preconfigured distance informs firmware 133 that this is a forward misalignment indicating that firmware 133 needs to control motor 163 and correspondingly latch 164, to assist spring plunger 162 in nudging module 165 forward in a direction away from the safe until the top mounted sensors 161 and 151 report being in alignment and until the preconfigured distance is reported by the distance sensor. Again, firmware 133 can also place motor 163 into neutral and allow spring plunger 162 to move module 165 into alignment on its own.

The top diagram of FIG. 3B shows that the alignment between the lower module 165 and intermediate module 150 is misaligned. As a result, a media catch point 153 is illustrated to show that notes/media could potentially jam when traveling between lower 165 and intermediate 150 modules.

Figure 3C:
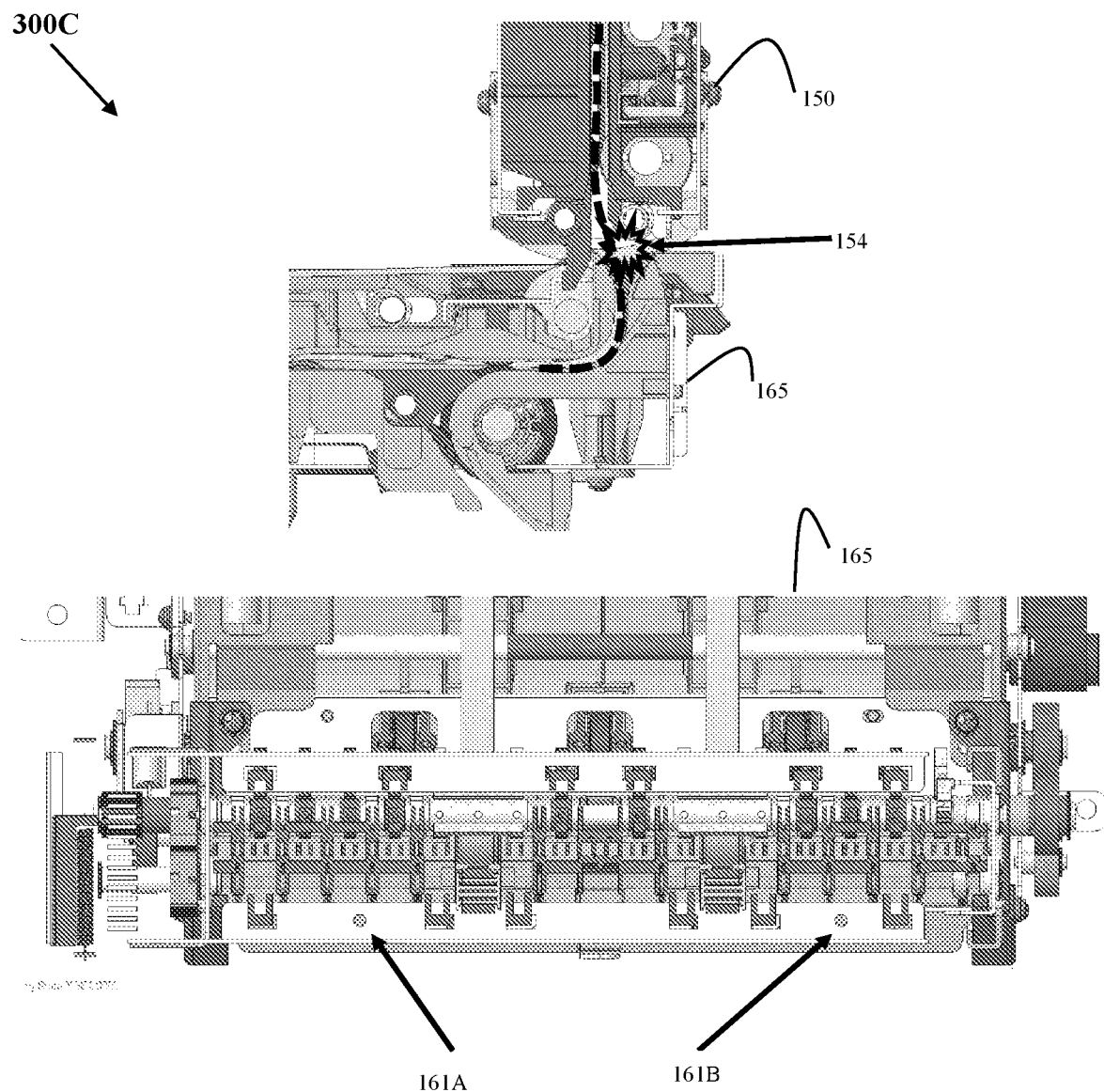
FIG. 3C illustrates a backward misalignment of the lower module and intermediate module with the sensors of the lower module blocked, according to an example embodiment.

FIG. 3C illustrates a diagram 300C for a backward misalignment of the lower module 165 and intermediate module 150 with the sensors 161 of the lower module 165 blocked, according to an example embodiment. Again, both lower module sensors 161 are blocked as illustrated by the greyed-out circles 161A and 161B in FIG. 3C.

This is similar to the alignment state discussed above with diagram 300B of FIG. 3B. In an embodiment, distance sensor 161 reports a distance indicating to firmware 133 that the back surface of module 165 is too far away from the back of the safe. Firmware 133 controls motor 163 and corresponding latch 164 to pull the back surface of module 165 back to a preconfigured distance of the back of the safe until top sensors 161 and 151 report being aligned with one another.

The top diagram of FIG. 3C shows that the alignment between the lower module 165 and intermediate module 150 is misaligned. As a result, a media catch point 154 is illustrated to show that notes/media could potentially jam when traveling between lower 165 and intermediate 150 modules.

Figure 3D:
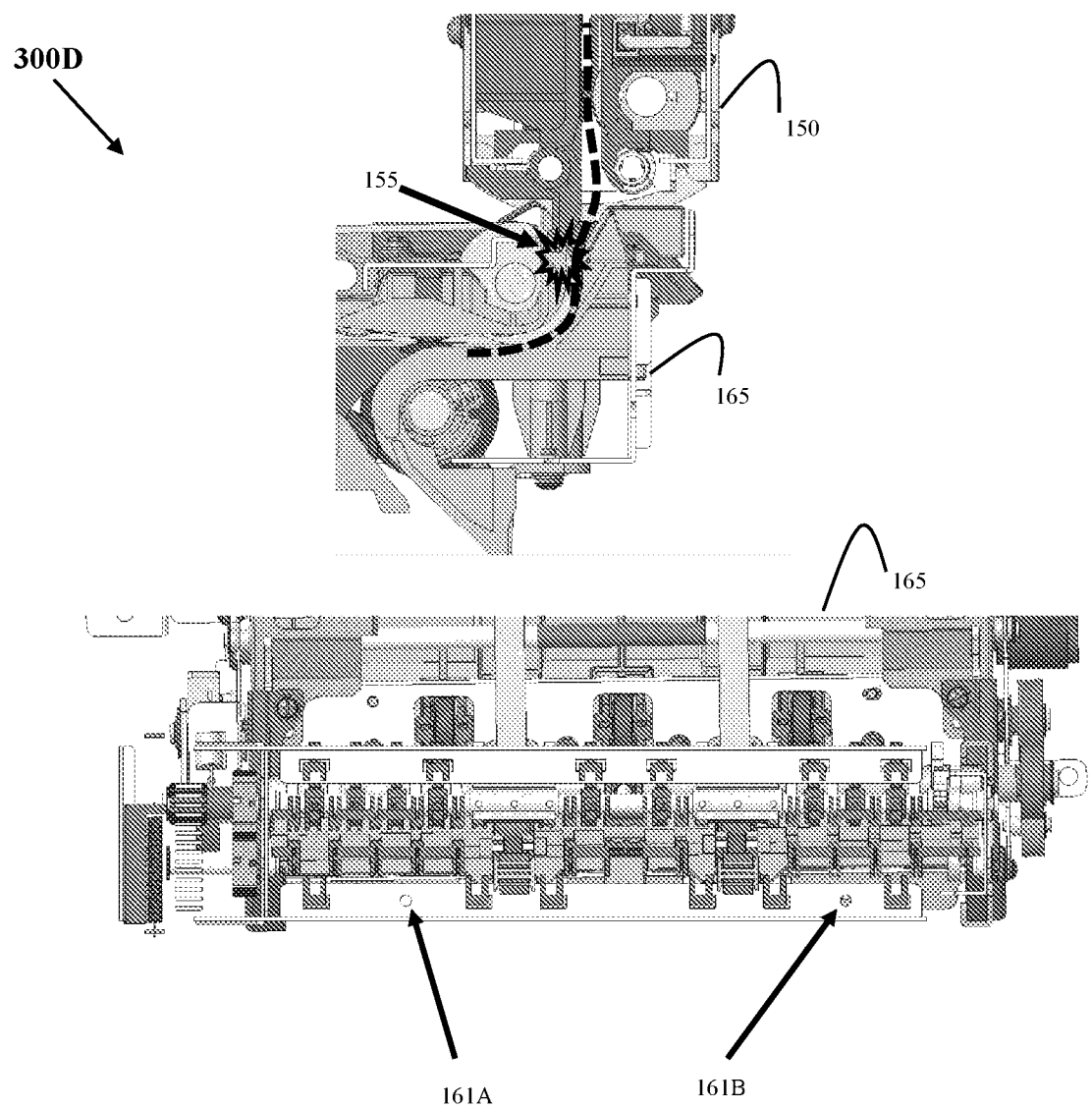
FIG. 3D illustrates a skewed left misalignment of the lower module and intermediate module with a left sensor blocked and a right sensor unlocked for the lower module, according to an example embodiment.

FIG. 3D illustrates a diagram 300D for a skewed left misalignment of the lower module 165 and intermediate module 150 with a left bottom mounted sensor 161 blocked (greyed-out circle 161B) and a right bottom mounted sensor 161 unlocked (unfilled and clear circle 161A) for the lower module 165, according to an example embodiment. Sensors 161 report to firmware 133 and firmware 133 determines that the module 150 is skewed to the left and needs pulled to the right within safe 160. Firmware 133 controls motor 163 and correspondingly latch 164 to pull the back surface of module 165 towards that back of the safe both sensors 161 report being clear.

The top diagram of FIG. 3D shows that the alignment between the lower module 165 and intermediate module 150 is misaligned. As a result, a media catch point 155 is illustrated to show that notes/media could potentially jam when traveling between lower 165 and intermediate 150 modules.

Figure 3E:
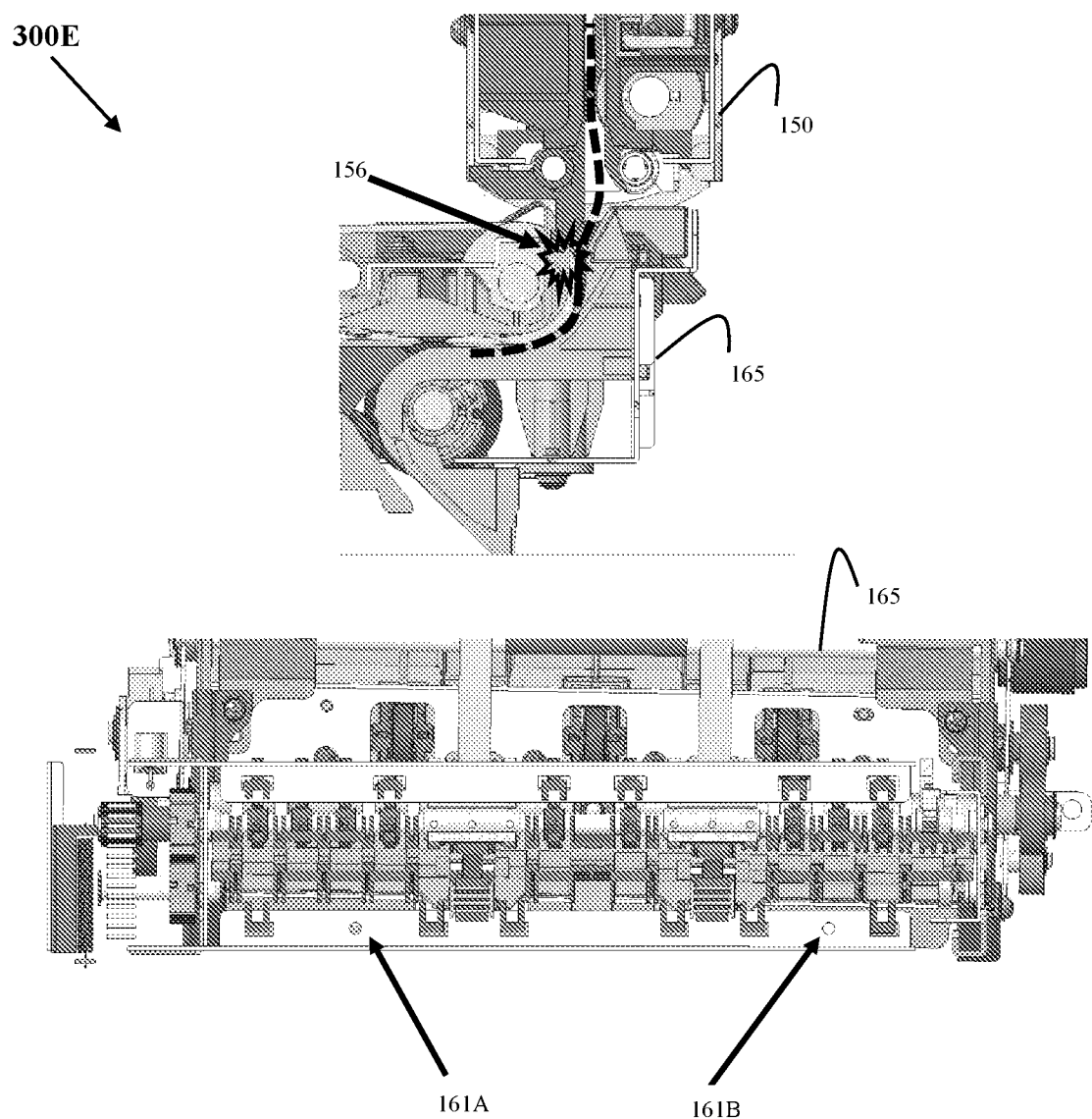
FIG. 3E illustrates a skewed right misalignment of the lower module and intermediate module with the right sensor blocked and the left sensor unblocked for the lower module, according to an example embodiment.

FIG. 3E illustrates a diagram 300E for a skewed right misalignment of the lower module 165 and intermediate module 150 with the bottom mounted right sensor 161 blocked (greyed-out circle 161A) and the bottom mounted left sensor 161 unblocked (clear or unfilled circle 161B) for the lower module 165, according to an example embodiment. Sensors report to firmware 133 and firmware 133 determines that the module 165 is skewed to the right and needs pushed to the right within safe 160. Firmware 133 controls motor 163 and correspondingly latch 164 to push the back surface of module 165 away from the back of the safe until the sensors 161 report being clear. Spring plunger 162 can also be used to push the module 165. In an embodiment, firmware 133 puts motor 163 into neutral and allows the spring plunger 162 to expand to its configured tension and move module 165 into alignment.

The top diagram of FIG. 3E shows that the alignment between the lower module 165 and intermediate module 150 is misaligned. As a result, a media catch point 156 is illustrated to show that notes/media could potentially jam when traveling between lower 165 and intermediate 150 modules.

In an embodiment, the media handling device 130 is a recycler and/or dispenser of a terminal 110. The terminal 110 is an automated teller machine (ATM). In an embodiment, the terminal 110 is a self-service terminal (SST). In an embodiment, the terminal 110 is a point-of-sale (POS) terminal. In an embodiment, the media items that are handled/managed by the media handling device 130 are banknotes, cash, and/or checks.

In an embodiment, when alignment necessitates pushing the module 165 forward or to the left, firmware 133 puts motor 163 in neutral allowing a configured tension of spring plunger 162 to extend to its configured tension and align the lower module 165 with the intermediate module 150. In an embodiment, firmware 133 activates motor 163 and controls motor 163 to nudge latch 164 forward or to the left to assist spring plunger 162 in bringing lower module 165 into alignment with intermediate module 150.

Figure 4:
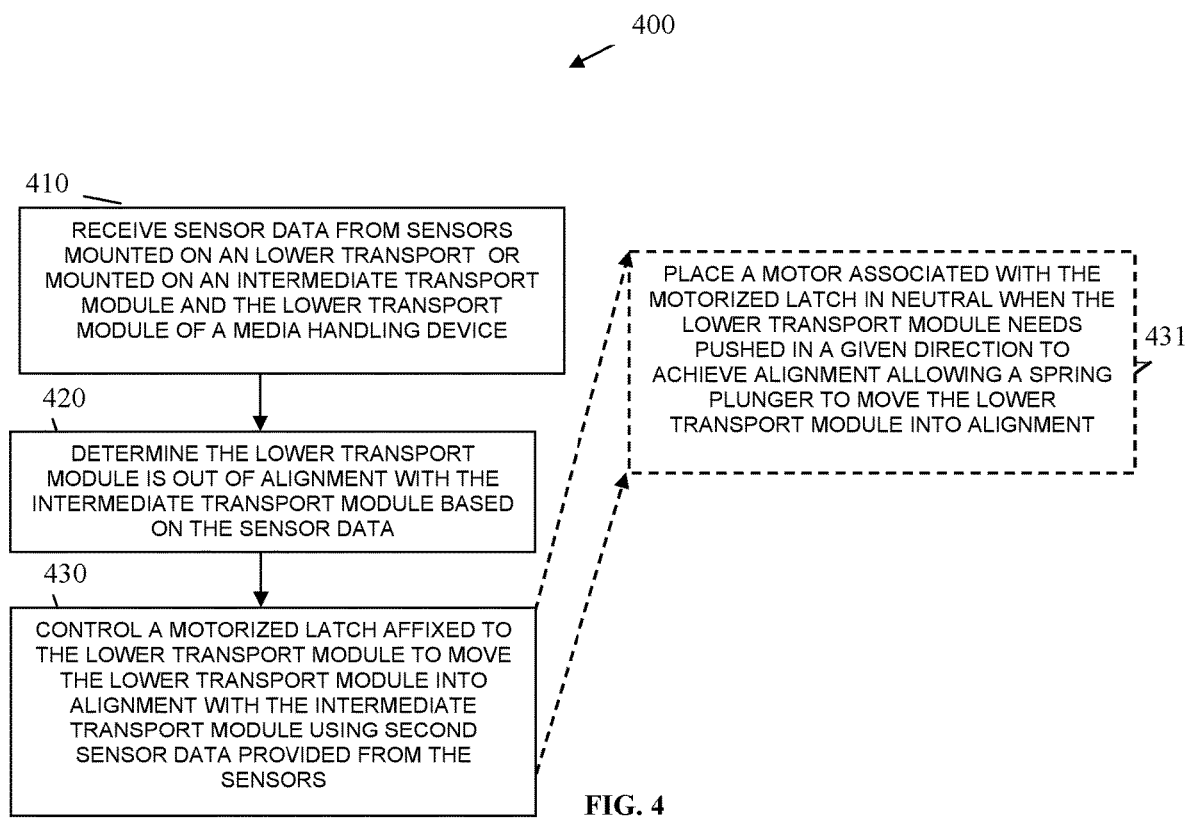
FIG. 4 is a flow diagram of a method for automatically aligning modules of a media handling device, according to an example embodiment.

The above-referenced embodiments and other embodiments will now be discussed with reference to FIG. 4. FIG. 4 is a flow diagram for automatically aligning modules of a media handling device, according to an example embodiment. The software module(s) that implements the method 400 is referred to as "firmware." The firmware is implemented as executable instructions programmed and residing within memory and/or a non-transitory computer-readable (processor-readable) storage medium and executed by one or more processors of one or more devices. The processor(s) of the device(s) that executes the firmware are specifically configured and programmed to process firmware. The firmware can or cannot have access to one or more network connections during its processing. Any connections can be wired, wireless, or a combination thereof.

In an embodiment, the device that executes the firmware is media handling device 130. In an embodiment, media handling device is a recycler or a dispenser. In an embodiment, the device that executes the firmware is safe 160 of media handling device 130. In an embodiment, the device that executes the firmware is lower module 165 of media handling device 130. In an embodiment, firmware is firmware 133.

At 410, the firmware, receives sensor data from sensors (161 or 151 and 161) mounted on a lower transport module 165 or mounted on an intermediate transport module 150 and the lower transport module 165 of a media handling device 130. In an embodiment, the lower transport module 165 includes a distance sensor 161 and a top mounted sensor 161, and the intermediate transport module 150 includes a bottom mounted sensor 151 In an embodiment, the lower transport module 165 includes two bottom mounted sensors and the intermediate transport module 150 does not include any sensor. In an embodiment, the intermediate module 150 includes a bottom mounted sensor 151 and the lower transport module 165 includes a top mounted sensor 161, a distance sensor 161, and two bottom mounted sensors.

At 420, the firmware, determines the lower transport module 165 is out of alignment with the intermediate transport module 165 based on sensor data reported by the sensors 161 or sensors 151 and 161. This can be achieved through sensor data associated with sensors 161 and 151 or through sensor data associated with just sensors 161.

At 430, the firmware, controls a motorized latch 164 affixed to the lower transport module 165 to move the lower transport module 165 into alignment with the intermediate transport module 150 using second sensor data provided from the sensors 161 or sensors 151 and 161. In an embodiment, at 431, the firmware paces a motor 163 associated with the motorized latch 164 in neutral when the lower transport module 150 needs pushed in a given direction to achieve alignment allowing a spring plunger 162 to move the lower transport module 165 into alignment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A media recycler or dispenser, comprising:
an intermediate transport module;
a lower transport module;
sensors to provide alignment data relevant to whether the intermediate transport module is aligned with the lower transport module;
a motorized latch affixed to the lower transport module; and
a processor coupled to the sensors to:
determine from the alignment data whether the intermediate transport module is aligned with the lower transport module or not; and
control the motorized latch to move the lower transport module into alignment with the intermediate transport module based on the alignment data.

2. The media recycler or dispenser of claim 1 further comprising:
a spring plunger with a configured tension to assist moving the lower transport module in a given direction for alignment.

3. The media recycler or dispenser of claim 1, wherein the lower transport module comprises:
a lid to a top of the lower transport module, wherein the lid comprises an aperture and a slit leading to the aperture in a bottom of a side of the lid; and a lid rail latch apparatus comprising:
a spring plunger;
a rail adapted to hold the spring plunger;
wherein the lid rail latch apparatus adapted to be inserted through the aperture and the slit and to latch the lid to the top of the lower transport module.

4. The media recycler of dispenser of claim 3, wherein the lid is unlatched when the lid rail latch apparatus is completely removed from the aperture and the slit of the lid permitting the lid to be separated from the top of the lower transport module.

5. The media recycler or dispenser of claim 1, wherein the sensors comprise:
a first sensor mounted to a bottom of the intermediate transport module;
a second sensor mounted to a top of the intermediate transport module; and
a distance sensor mounted to a side of the lower transport module.

6. The media recycler or dispenser of claim 1, wherein the sensors comprise:
a pair of sensors mounted to a bottom of the lower transport module.

7. The media recycler or dispenser of claim 1, wherein the motorized latch comprises a motor and a latch controlled by the motor.

8. The media recycler or dispenser of claim 1, wherein the media recycler or dispenser is a peripheral device of a terminal.

9. The media recycler or dispenser of claim 8, wherein the terminal is an automated teller machine, a self-service terminal, or a point-of-sale terminal.

10. The media recycler or dispenser of claim 1 further comprising:
a safe module comprising the lower transport module and media cassettes.

11. A terminal, comprising:
a terminal processor to perform media transactions;
first peripherals for performing the media transactions; and
a media handling device peripheral to handle deposited media and dispensed media during the media transactions at the terminal, wherein the media handling device comprises:
an intermediate transport module;
a lower transport module;
sensors to report alignment data between the intermediate transport module and the lower transport module; and
a processor coupled to the sensors to:
determine whether the intermediate transport module is aligned with the lower transport module using the alignment data provided by the sensors; and
control a motorized latch to move the lower transport module into alignment with the intermediate transport module based on the alignment data.

12. The terminal of claim 11, wherein the terminal is an automated teller machine, a self-service terminal, or a point-of-sale terminal.

13. The terminal of claim 11, wherein media handling device further includes a safe module, and the safe module includes the lower transport module and media cassettes.

14. The terminal of claim 11, wherein the media handling device further includes a spring plunger with a configured tension to assist moving the lower transport module in a given direction for alignment.

15. The terminal of claim 11, wherein the lower transaction module comprises:
   a lid to a top of the lower transport module, wherein the lid comprises an aperture and a slit leading to the aperture in a bottom of a side of the lid; and
   a lid rail latch apparatus comprising:
     a spring plunger;
     a rail adapted to hold the spring plunger;
   wherein the lid rail latch apparatus adapted to be inserted through the aperture and the slit and to latch the lid to the top of the lower transport module.

16. The terminal of claim 11, wherein the sensors comprise:
   a first sensor mounted to a bottom of the intermediate transport module;
   a second sensor mounted to a top of the intermediate transport module; and
   a distance sensor mounted to a side of the lower transport module.

17. The terminal of claim 11, wherein the sensors comprise:
   a pair of sensors mounted to a bottom of the lower transport module.

18. The terminal of claim 11, wherein the media handling device is a recycler or a dispenser.

19. A method, comprising:
   receiving sensor data from sensors mounted on an intermediate transport module and a lower transport module of a media handing device;
   determining the lower transport module is out of alignment with the intermediate transport module based on the sensor data; and
   controlling a motorized latch affixed to the lower transport module to move the lower transport module into alignment with the intermediate transport module using second sensor data provided from the sensors.

20. The method of claim 19, wherein controlling further includes placing a motor associated with the motorized latch in neutral when the lower transport module needs pushed in a given direction to achieve alignment allowing a spring plunger to move the lower transport module into alignment.

* * * * *